(12) United States Patent
He et al.

(10) Patent No.: US 6,701,034 B2
(45) Date of Patent: Mar. 2, 2004

(54) DIGITAL OPTICAL SWITCH

(75) Inventors: Jian-Jun He, Ottawa (CA); André Delage, Gloucester (CA)

(73) Assignee: National Research Council of Canada, Ottawa (CA)

( * ) Notice: Subject to any disclaimer, the term of this patent is extended or adjusted under 35 U.S.C. 154(b) by 0 days.

(21) Appl. No.: 09/982,253

(22) Filed: Oct. 19, 2001

(65) Prior Publication Data

US 2002/0061155 A1 May 23, 2002

Related U.S. Application Data

(63) Continuation-in-part of application No. 09/714,256, filed on Nov. 17, 2000.

(51) Int. Cl.$^7$ ................................................. G02B 6/26
(52) U.S. Cl. .............................. 385/16; 385/9; 385/45; 385/21; 385/22
(58) Field of Search ........................ 385/8, 9, 16–22, 385/45, 41, 40

(56) References Cited

U.S. PATENT DOCUMENTS

| | | |
|---|---|---|
| 4,545,078 A | 10/1985 | Wiedeburg |
| 4,806,997 A | 2/1989 | Simmons et al. |
| 4,820,009 A | 4/1989 | Thaniyavarn |
| 5,013,113 A | 5/1991 | Soref |
| 5,148,505 A | 9/1992 | Yanagawa et al. |
| 5,238,867 A | 8/1993 | Kwon et al. |
| 5,260,586 A | 11/1993 | Kondoh et al. |
| 5,288,659 A | 2/1994 | Koch et al. |
| 5,581,108 A | 12/1996 | Kim et al. |
| 5,712,935 A * | 1/1998 | Miyakawa .................... 385/22 |
| 5,822,480 A | 10/1998 | Jeong et al. |
| 5,878,181 A | 3/1999 | Van Der Tol |
| 5,889,898 A * | 3/1999 | Koren et al. .................... 385/9 |
| 5,991,475 A | 11/1999 | Nelson |

* cited by examiner

Primary Examiner—Hung N. Ngo
(74) Attorney, Agent, or Firm—Freedman & Associates

(57) ABSTRACT

In a digital optical switch, an input waveguide and two output waveguides form a Y-shaped splitter or switch. Electrodes are positioned on each output waveguide at the junction with the input waveguide. The electrodes extend as narrow strips across the waveguides. The inner edges of the electrodes are curved to form a smooth continuation profile to the signal paths to reduce losses.

17 Claims, 4 Drawing Sheets

DIGITAL OPTICAL SWITCH

This is a continuation-in-part of U.S. patent application Ser. No. 09/714,256 filed Nov. 17, 2000.

This invention relates to digital optical switches, and in particular is concerned with the improvement of such switches.

BACKGROUND OF THE INVENTION

Optical space switches play a key role in optical communication networks. They can perform optically transparent network reconfiguration, routing, optical cross-connects and optical packet switching. In combination with passive wavelength multiplexers and demultiplexers, the space switches or switch arrays can be used to realize dynamic reconfigurable wavelength routers and wavelength add-drop multiplexers. As the dense wavelength division multiplexing (DWDM) technology is broadening its applications from mostly long-haul point-to-point transmission systems to metropolitan and local area access networks, compact, low-cost and high-performance optical switches and switch arrays will become more and more important.

Integrated planar waveguide optical switches are very attractive due to their small size, large scalability and potential for monolithic integration with waveguide DWDM (de)multiplexers. Their implementation in InGaAsP/InP material system also allows monolithic integration with semiconductor optical amplifiers that can compensate for the overall loss of the switches. While good performance in terms of loss, crosstalk and speed is important, the integrated waveguide devices have additional challenges in terms of polarization sensitivity, temperature sensitivity and wavelength dependence. A number of waveguide based optical switches have been developed. They include interferometric devices such as directional couplers and Mach-Zehnder interferometers, digital optical switches based on modal evolution in conventional Y-junction branch and based on total internal reflection (TIR), and field-induced waveguide switches.

Directional couplers and Mach-Zehnder interferometers are both based on mode interference effect. They require a precise drive-voltage or current control in order to achieve the switching with a high extinction ratio. The operating voltage or current is dependent on wavelength, thus making multi-wavelengths simultaneous switching impossible in WDM systems. They are also sensitive to polarization and temperature and have small fabrication tolerances.

Digital optical switches (DOS) exhibit a digital transfer response for a wide range of drive voltage/current. To a certain extent, they are independent of wavelength. And they are not sensitive to polarization and temperature. The most commonly used form of digital optical switch is the linear Y-junction branch as illustrated in FIG. 1. Its operating principle is based on adiabatic mode evolution rather than mode interference as in the case of directional couplers and Mach-Zehnder interferometers. In order to ensure adiabatic mode coupling, the angle between the branching waveguides needs to be very small. This leads to a long device length. Since a switch array with a large number of input/output ports requires cascading of many stages of switches, a small device length is highly desirable. The adiabatic coupling also requires that the waveguide structure be weakly guiding so that its index step can be modified by a small index change induced by the drive current/voltage. The cladding layer thickness and etching depth thus needs to be accurately controlled and fabrication-induced strain must be minimized to avoid stress-induced guiding or anti-guiding effects. Another practical issue is the crosstalk. Although several structures have been proposed to improve the crosstalk, no experiment has been reported with crosstalk lower than −20 dB and the theoretically calculated crosstalk is in the order of −25 dB for a single stage switch.

Another form of digital optical switch, based on guided mode total internal reflection (TIR), is illustrated in FIG. 2, which shows the schematic of a TIR switch. Two single mode waveguides intersect at a small angle. A metal contact covering half of the intersection region is deposited on the top surface of the waveguide. When current is injected into the region, the refractive index decreases and a total internal reflection interface is formed which switches the light from one output port to another. The intersection angle is relatively large and therefore compact switch can be fabricated. The switch also exhibits digital response and is insensitive to wavelength and polarization. However, a large refractive index change is required in order to achieve the total internal reflection condition. Furthermore, switching characteristics of the reflection and transmission ports are unsymmetrical, which may limit its use for certain applications.

Another type of switches, based on field-induced waveguides, is schematically shown in FIG. 3. The device consists of an X- or Y-junction. The lateral optical confinement in the input branches is achieved by using ridge waveguides. In the output branches, only metal contacts are formed and no lateral confinement exists initially. When one of the output branches is reverse biased, the refractive index of the region underneath the metal contact increase (through quantum confined Stark effect or carrier depletion effect) and thus the lateral confinement is achieved. The optical signal at the corresponding output port increases due to the waveguiding effect. A major problem with this device is the high loss, since no or little optical power is transferred from the off port to the on port during the switching except for a small coupling effect in the junction region.

Typical X and Y junction switches are described in U.S. Pat. No. 5,148,505 to Hisaharu Yanagawa et al, and an optical switch with curved waveguides is described in U.S. Pat. No. 5,991,475 to William H. Nelson. These switches suffer from the same problems as outlined above. Many other optical switches are described in the prior art, having similar problems. Basically, losses at the switch are now becoming a very important factor in the overall optical system.

SUMMARY OF THE PRESENT INVENTION

The present invention provides an improved optical switch with reduced losses. Broadly a 1×2 switch comprises two intersecting curved output waveguides which connect smoothly with an input waveguide, and a particularly shaped metal contact is positioned on top of each output waveguide, at the intersection. Thus, in accordance with the present invention, an improved optical switch has an input waveguide and two output waveguides diverging from the input waveguide, extending in smooth curves from a junction. One electrode extends across each output waveguides at the junction; the electrodes are separated by a narrow gap. Each electrode on each waveguide extends in a smooth continuation of the inner edge of the other waveguide, to provide a smooth transition from the input waveguide to an output waveguide.

DETAILED DESCRIPTION OF THE INVENTION

Figure 1:
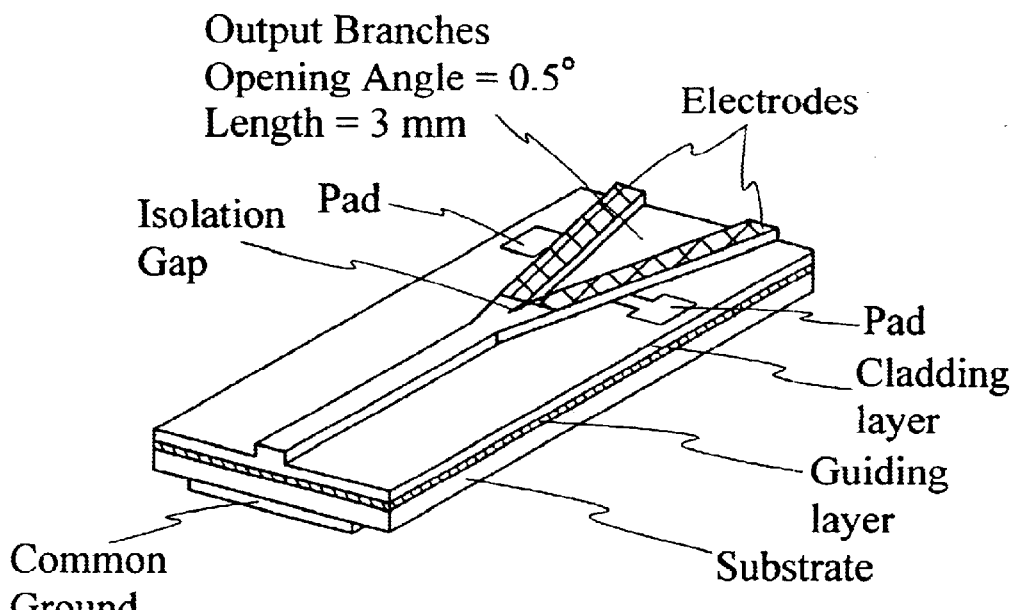
FIG. 1 illustrates a known form of linear Y function width.
Figure 2:
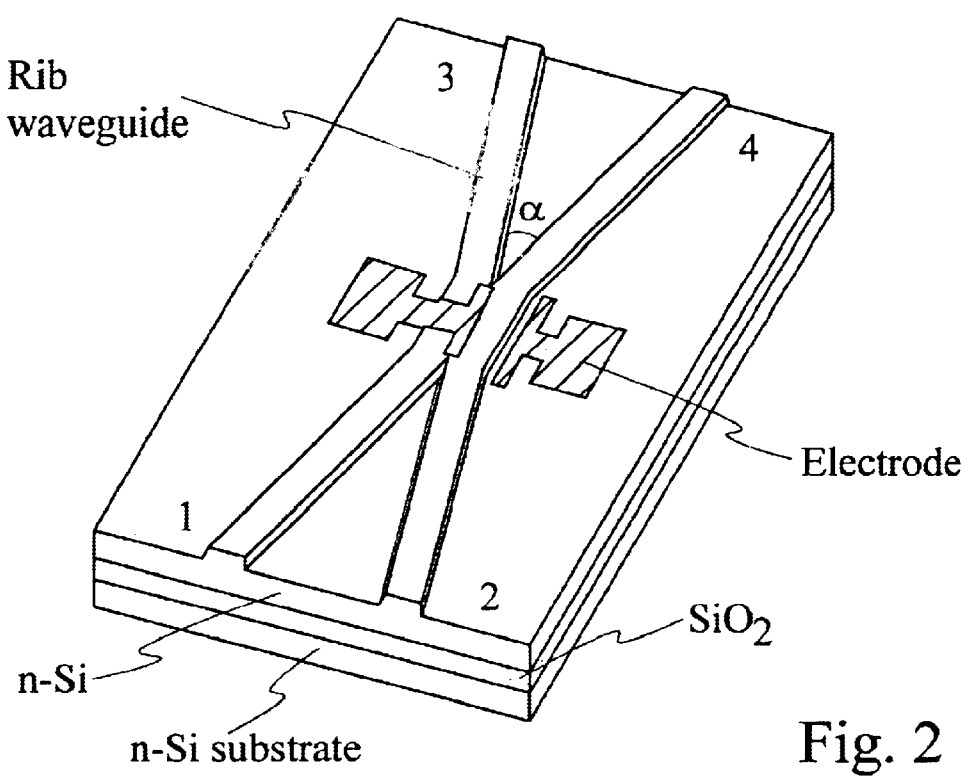
FIG. 2 illustrates a known form of a total internal reflection (TIR) switch.
Figure 3:
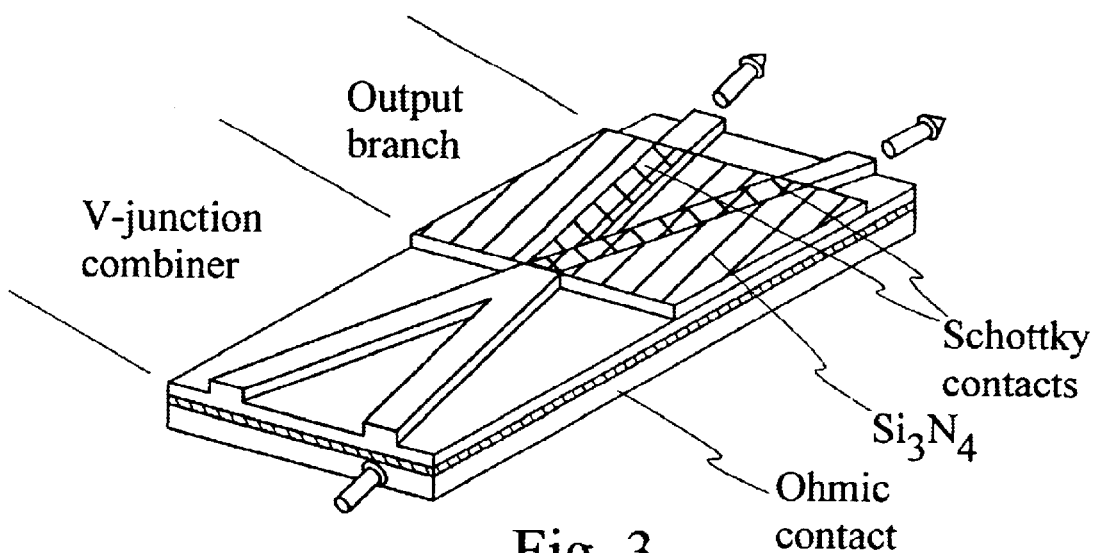
FIG. 3 illustrates a further form of known optical switch.

As described above, the form of switch illustrated in FIG. 1 is the most commonly used form of digital optical switch, having a Y-junction branch. The electrode over the output branches determines how the input at the input branch is divided between the output branches, the division ranging from 100% in one output and zero in the other to a zero in the one and a 100% in the other. Similar division can be obtained in the examples in FIGS. 2 and 3. As stated above, losses in the signals being transmitted will occur.

Figure 4:
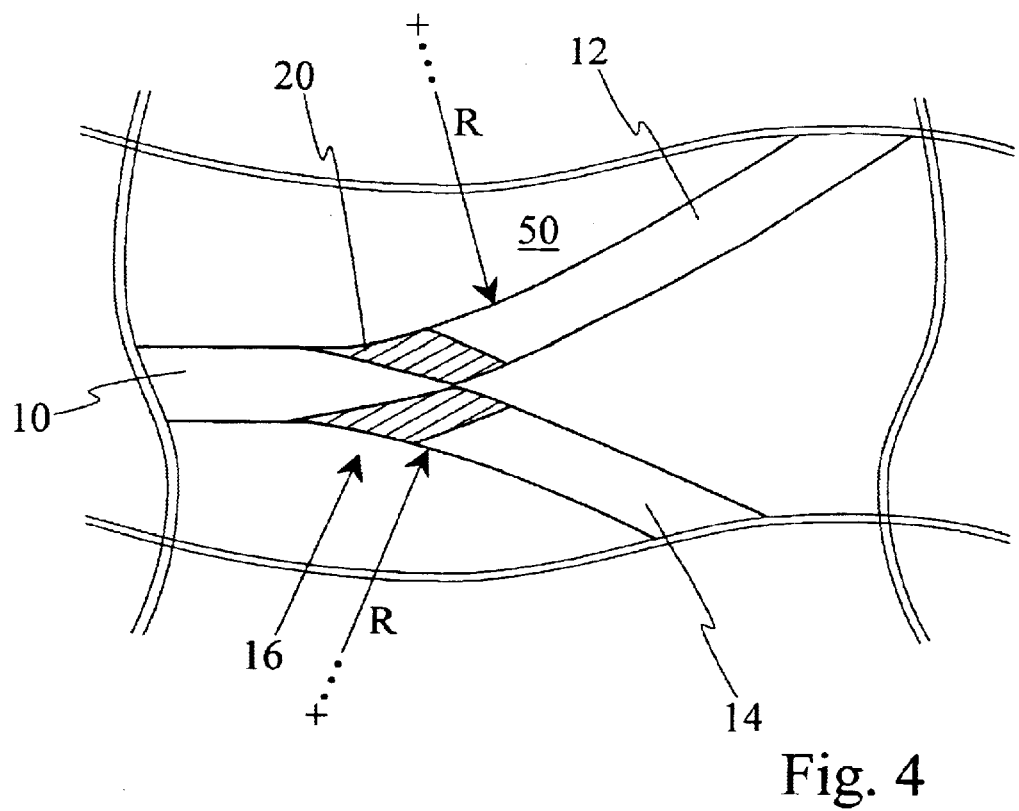
FIG. 4 is a plan view illustrating a form of optical switch in accordance with the present invention.
Figure 5:
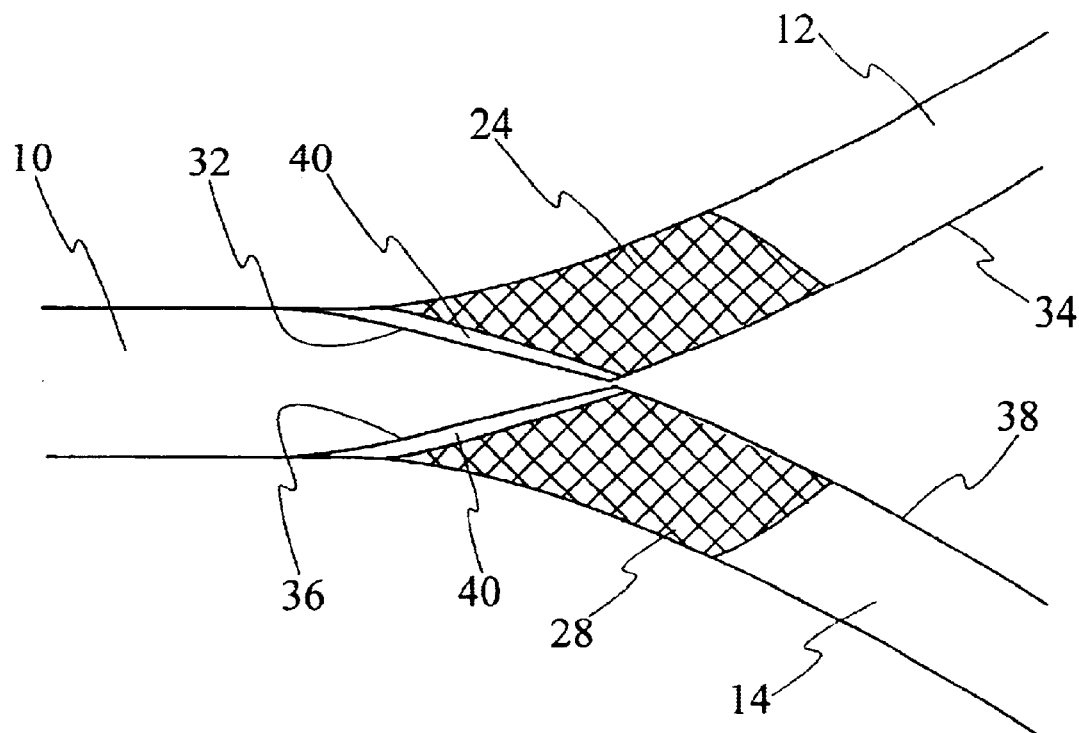
FIG. 5 is an enlarged view of the function of the switch illustrated in FIG. 4.
Figure 6:
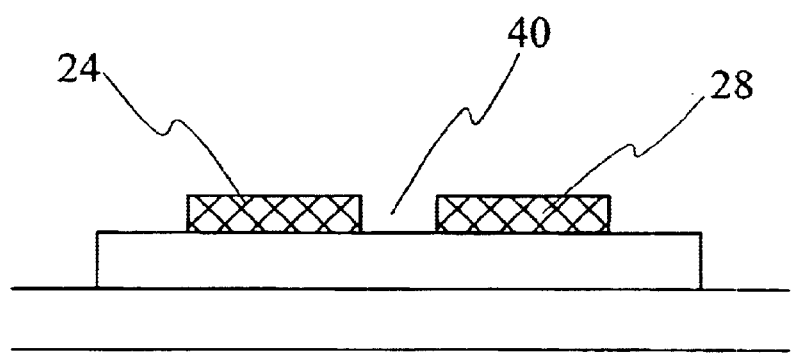
FIG. 6 is a cross-section on the line A—A of FIG. 5.

FIGS. 4, 5 and 6 illustrate an optical switch, or divider, in accordance with the present invention. The switch comprises an input waveguide 10 and output waveguides 12 and 14, formed on a waveguide slab 50, the waveguides 12 and 14 dividing from waveguide 10 at a junction 16. The division of the waveguides occurs in the form of smooth curves their being a smooth connection between the waveguides 12 and 14 and the waveguide 10, having a known curvature.

A metal contact pattern 20 is deposited on the top of each output waveguide 12, 14. The metal contact pattern 20 is illustrated more clearly in FIG. 5. The pattern comprises one electrode 24 on waveguide 12 and one electrode 28 on waveguide 14. A smooth continuation of the inner edge 38 of the waveguide 14 extends in a smooth curved-fashion at the junction forming an inner edge 32 at the electrode 24. A gap 40 separates a line along a smooth transition from the inner edge 32 from an edge of the electrode 24 on waveguide 12. Similarly, a smooth continuation of the inner edge 34 of the waveguide 12 extends in a smooth curved-fashion at the junction forming an inner edge 36 at the electrode 28. A gap 40 separates the inner edge 36 from the electrode 28 on waveguide 14. The gap 40 has a width Δ.

With an input signal on waveguide 10, and no potential applied to the electrodes 24 and 28, with no change in refractive index of the actual waveguide, the signal will be directed equally between the two output waveguides 12 and 14. If a potential is applied across electrode 24, and also across electrode 28, changing the refractive index, no signal will propagate along the output waveguides.

If a potential is applied across one of the electrodes 24 or 28, then the signal will be blocked from the waveguide having the electrode to which the potential is applied. Thus, with a potential applied to electrode 24, the signal will propagate along waveguide 14, and with a potential applied to electrode 28, the signal will propagate along waveguide 12.

It is possible to apply a potential to a conductor such that complete blockage of the signal does not occur. It is possible, by control of the applied potentials to vary the splitting of the signal from a minimum in the output and a maximum in the other waveguide to a maximum in the one output and a minimum in the other.

As an exemplary embodiment, the waveguide is formed of a semiconductor material such as InP, Si, SiGe, GaAs, or LiNbO$_3$ and the applied potential is a forward bias sufficient to induce the desired changes in the waveguide refractive index. Carriers are injected resulting in a decrease in the refractive index in the region beneath the metal contact. When the injected current exceeds a predetermined level, the lateral confinement of the waveguide beneath the metal contact—the electrode—of the "off" branch disappears. At a same time, the missing segment of the inner edge of the waveguide corresponding to the "on" branch is formed.

With the curved profiles of the electrodes 24 and 28 smooth waveguides are formed from the input waveguide 10 to the output waveguides 12 and 14. This reduces losses in the switching to an extremely low level.

Although the symmetric Y-junction waveguide branches for the proposed 1×2 switch look similar to the conventional DOS using adiabatic mode evolution, the switching mechanism is different. In fact, its principle of operation is closer to the TIR switch if the waveguide wall formed by the carrier injection is viewed as a total internal reflection mirror. The switch is therefore very compact. The required electrode length is much shorter than the DOS using adiabatic mode evolution. Due to the curved waveguiding geometry, the required index step change is much smaller than in the case of conventional TIR switches. In addition to the formation of the waveguide wall for the on port, the waveguide at the off-branch is deformed at the same time. This further reduces the crosstalk. Carrier induced absorption in the "off" branch—in the region below the forward biased electrode— further improves an extinction ratio of the device.

Figure 7:
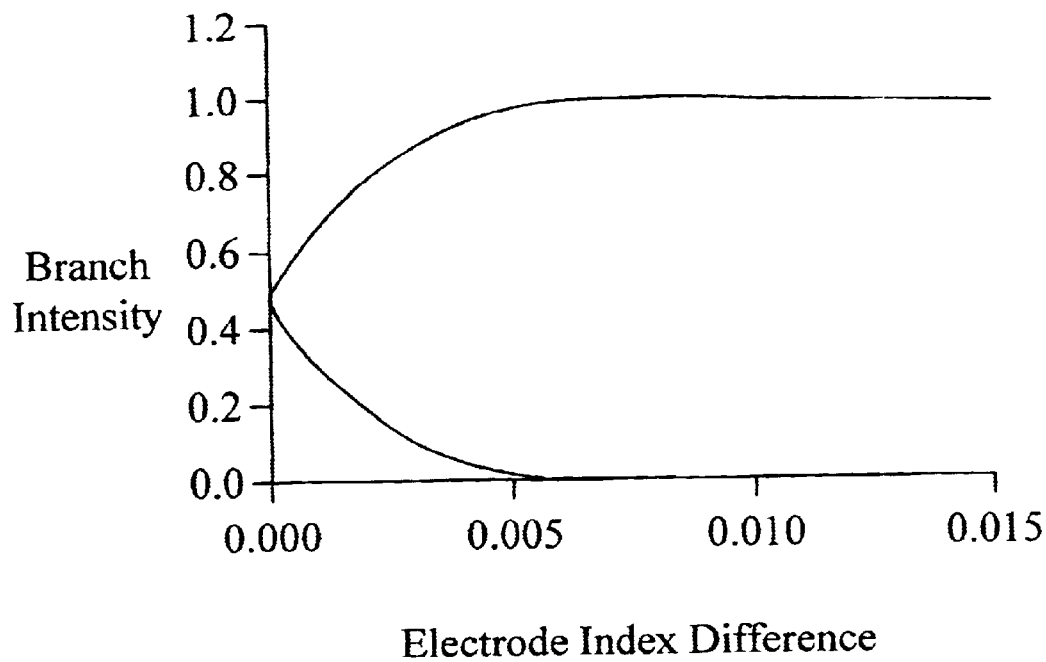
FIG. 7 illustrates the power transfer response in a switch in accordance with the present invention.

FIG. 7 shows the optical power transfer response of an InP-based 1×2 switch, in accordance with the invention, simulated using the Beam Propagation Method (BPM). In this example, the waveguide is 4 μm, the curved waveguide radius is 28 mm and the junction angle is 1.37°. The length of the electrodes is only 360 μm. The total device length for the output port separation of 40 μm is only 1.5 mm. The effective indices of the ridge waveguide 10, 12, 14 and the surrounding slab waveguide 50 used in the simulation are 3.185 and 3.177, respectively. When no current is injected, the optical power is distributed evenly between the two output waveguides. When a current is injected in one of the metal contacts, the refractive index of the waveguide branch under the electrodes decreases and the optical power is transferred to the other branch. The power is almost completely transferred with a refractive index change of only 0.005. It does not transfer back as the index further decreases, thus the digital response feature is confirmed.

Figure 8:
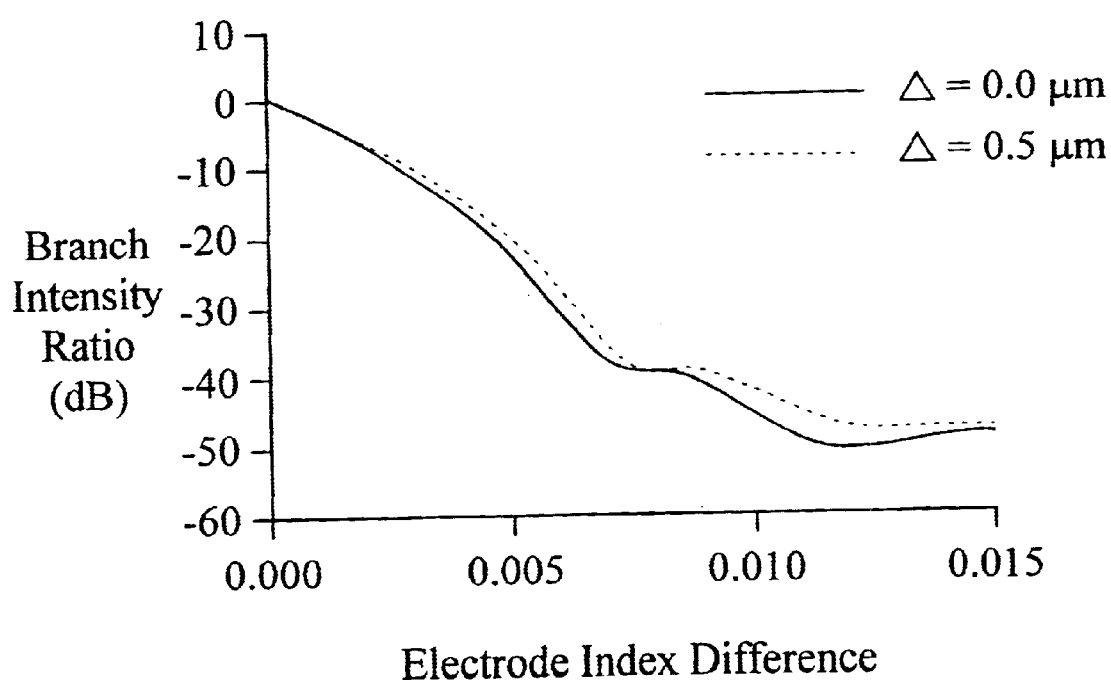
FIG. 8 shows the ratio of the optical power in the two output ports, in a logarithmic scale for two different ratios of the isolation gap.

In FIG. 8 is plotted the ratio of the optical power in the two output waveguides in logarithmic scale, for two different values of the isolation gap 40, identified as Δ. It can be seen that a crosstalk of less than −40 dB can be achieved theoretically. The switching response function is not affected significantly when the isolation gap is much smaller than the waveguide width.

In summary, the proposed optical switch is compact, symmetric and has a low drive current and low crosstalk. It has a digital response characteristic that makes it insensitive to wavelength, polarization and temperature. The proposed output branching structure can also be symmetrically folded into the input side to form a 2×2 switch.

Numerous other embodiments may be envisioned without departing from the spirit or scope of the invention. For example, the curvature of the branches may be other than portions of a circle.

What is claimed is:

1. A digital optical switch, comprising:

an input waveguide;

first and second output waveguides diverging from said input waveguide at a junction said output waveguides extending in smooth curves from said input waveguide;

an electrode pattern on each output waveguide at said junction, said pattern comprising at least one electrode extending at least partially across each waveguide, the at least one electrode on each waveguide being separated from each other by at least a narrow gap;

each electrode on a waveguide including an inner edge extending in an approximately smooth continuation of the inner edge of the other waveguide;

whereby, in use when one electrode is powered, a smooth transition from the input waveguide to an output waveguide is provided.

2. An optical switch as claimed in claim 1, wherein said smooth curve is of a curvature for supporting guiding of light within the waveguide.

3. An optical switch as claimed in claim 2, wherein the length of each electrode extends from an edge of the waveguide to a junction between first and second output waveguides for completing a smooth curve therebetween.

4. An optical switch as claimed in claim 1, wherein the electrodes are formed by depositing a single metal electrode forming a substantially smooth continuation of the inner edge of the other waveguide and etching the metal in a region thereof adjacent the edge forming the smooth continuation of the inner edge to result in two metal electrodes on two waveguides separated by a gap.

5. An optical switch as claimed in claim 1, wherein the electrodes are formed by depositing a single metal electrode forming a substantially smooth continuation of the inner edge of the other waveguide and etching the metal at said junction to result in two metal electrodes on two waveguides separated by a gap.

6. A digital optical switch as defined in claim 1 wherein the waveguides are semiconductor waveguides.

7. A digital optical switch as defined in claim 6 wherein the waveguides are InP waveguides.

8. A digital optical switch, comprising:

an input waveguide;

first and second output waveguides diverging from said input waveguide at a junction said output waveguides extending in smooth curves from said input waveguide;

a first electrode on the output waveguides at said junction, said electrode extending across the first output waveguide and approximately along a smooth curve from the input waveguide to the second output waveguide;

a second electrode on the output waveguides at said junction, said electrode extending across the second output waveguide and approximately along a smooth curve from the input waveguide to the first output waveguide;

whereby, in use when one of the first and second electrodes is biased in a predetermined manner, a refractive index change in the waveguide below the electrode results in a smooth transition for light from the input waveguide to one of the first and second output waveguides.

9. A digital optical switch as defined in claim 8 wherein the one of the first and second output waveguides is the output waveguide approximately continuous with the one of the first and second electrodes.

10. A digital optical switch as defined in claim 8 wherein the length of the electrodes is compact.

11. A digital optical switch as defined in claim 10 wherein the length of the electrodes is approximately 360 $\mu$m.

12. A digital optical switch as defined in claim 7 wherein the waveguide is a semiconductor waveguide.

13. A digital optical switch as defined in claim 12 wherein the waveguides are InP waveguides.

14. A digital optical switch as defined in claim 12 wherein the first and second electrodes and the smooth curve are separated by a gap.

15. A digital optical switch as defined in claim 14 wherein the gap is a narrow gap.

16. A digital optical switch as defined in claim 12 wherein the first and second electrode are spaced apart by a small distance.

17. A digital optical switch as defined in claim 12 wherein in use biasing of one of the first and second electrode in a predetermined manner increases the extinction ration for light propagating thereunder.

* * * * *